United States Patent [19]

Bastian et al.

[11] Patent Number: 4,745,850
[45] Date of Patent: May 24, 1988

[54] DIFFUSIVE VENTING OF SOIL CONTAMINATED WITH VOLATILE COMPOUNDS

[75] Inventors: Bruce N. Bastian; Marion W. Kemblowski; Edward H. Hsu, all of Houston, Tex.

[73] Assignee: Shell Oil Company, Houston, Tex.

[21] Appl. No.: 940,144

[22] Filed: Dec. 10, 1986

[51] Int. Cl.$^4$ .............................................. E02D 3/00
[52] U.S. Cl. ................................... 98/56; 98/57; 405/128; 405/258; 405/36
[58] Field of Search ............... 34/38, 225, 241, 243 R; 98/56, 57; 405/41, 43, 36, 128, 129, 258

[56] References Cited

U.S. PATENT DOCUMENTS

| | | | |
|---|---|---|---|
| 2,929,154 | 3/1960 | Finnegan | 98/56 |
| 3,628,607 | 12/1971 | Dietz | 166/52 |
| 3,846,290 | 11/1974 | Raymond | 210/620 |
| 4,288,174 | 9/1981 | Laws | 405/43 |
| 4,293,237 | 10/1981 | Robey | 405/43 |
| 4,306,490 | 12/1981 | Kallestad et al. | 98/56 |
| 4,310,892 | 3/1982 | Von Kohorn | 405/43 |
| 4,348,135 | 9/1982 | St. Clair | 405/36 |
| 4,358,221 | 11/1982 | Wickberg | 405/36 |
| 4,401,569 | 8/1983 | Shaveri et al. | 210/170 |
| 4,483,641 | 11/1984 | Stoll | 406/129 |

Primary Examiner—Larry I. Schwartz
Attorney, Agent, or Firm—Ronald R. Reper

[57] ABSTRACT

A system employing wind-driven venting for reducing the volatile organics content of soil contaminated by leakage or accidental spill of volatile organics such as petroleum hydrocarbons is disclosed.

5 Claims, 1 Drawing Sheet

DIFFUSIVE VENTING OF SOIL CONTAMINATED WITH VOLATILE COMPOUNDS

BACKGROUND OF THE INVENTION

This invention relates to a system employing wind-driven venting for reducing the volatile organics content of soil contaminated by leakage or accidental spill of volatile organics, such as e.g. petroleum hydrocarbons and organic chemicals.

Widespread utilization of petroleum and chemical products in modern society has resulted that these materials are often produced, stored and transported in remote, scarcely populated areas. In such areas, soil contamination from accidental spills and leaks of, e.g. gasoline, can be a problem.

Generally oil and chemicals spilled on undisturbed ground will tend to simply move downwardly under the force of gravity, with some lateral spreading. The rate of movement will depend largely upon the permeability of the soil and the viscosity of the contaminant. Unless the contaminant encounters an impermeable layer or the capillary fringe, i.e. the water saturation zone associated with the water table, downward penetration will continue until the amount of material leaked or spilled is exhausted to immobility. For example, a spill of 100 barrels of gasoline onto a soil having a porosity of 30% will contaminate on the order of 700 cubic yards of soil. If 20% of the gasoline could be removed according to the invention then only about 560 cubic yards would be involved and the depth of penetration may be substantially lessened. This lessening may be particularly helpful where there is a risk of the contaminant reaching the water table, or that soluble components thereof may be leached into the groundwater before natural biodegradation occurs.

Methods for stimulating biodegradation of hydrocarbons in soil and groundwater are known, and described, for example, in U.S. Pat. No. 4,401,569 and U.S. Pat. No. 3,846,290. A method for removing taste spoiling components of oil spilled in a drinking water catchment area is disclosed in U.S. Pat. No. 3,628,607. A method for reducing gasoline vapors from coarse and fine sand is disclosed in American Petroleum Institute Publication No. 4431 relating to forced venting of gasoline vapor. In this procedure air is admitted through sunken vertical pipes having screened holes or slots near the bottom, and is drawn through the porous sand containing the spilled gasoline into one, or a plurality of manifolded-together, sunken exhaust pipes also having screened holes or slots near the bottom, and thence to the suction side of a spark-arrested centrifugal type pressure blower. Such a method would be difficult to apply in less porous soil, and power to operate this type of blower may not be readily available in remote locations. The present invention provides a simple, relatively inexpensive solution to these problems.

SUMMARY OF THE INVENTION

The invention provides a system for reducing the concentration of volatile organic compounds in soil contaminated with volatile organic compounds which comprises:

a first vertically positioned bore hole within or adjacent the contaminated area and traversing the soil to a depth above the capillary fringe of the water table, said first borehole communicating at its upper end with ambient air, a horizontally positioned conduit traversing said contaminated soil at an elevation above said capillary fringe and having an inlet end in fluid communication with said first borehole, and having a plurality of apertures disposed along its length for admitting vapors of said volatile organic compounds to the interior of said horizontally positioned conduit, a second vertically positioned borehole within or adjacent the contaminated area and spaced apart from said first borehole, said second borehole being in fluid communication with said horizontally positioned conduit, and having an upper end in fluid communication with air above the surface of the soil, and wind-driven venting means operatively connected to said upper end of said second vertically positioned borehole to draw ambient air through said first borehole, thence through said horizontally positioned conduit and said second borehole to sweep vapors in said volatile organic compounds that have entered the system from the soil into the atmosphere to be dispersed by the wind.

DESCRIPTION OF PREFERRED EMBODIMENTS

The present invention provides a simple to construct, low cost, simple to install system requiring little or no supervision or maintenance, and which may significantly reduce the concentration of volatile contaminants in soil.

The invention is usefully applied to soils, particularly to those of low porosity, where the contaminant might otherwise persist for prolonged periods, and represent a hazard to underlying groundwater long after the contamination event.

Figure 1:
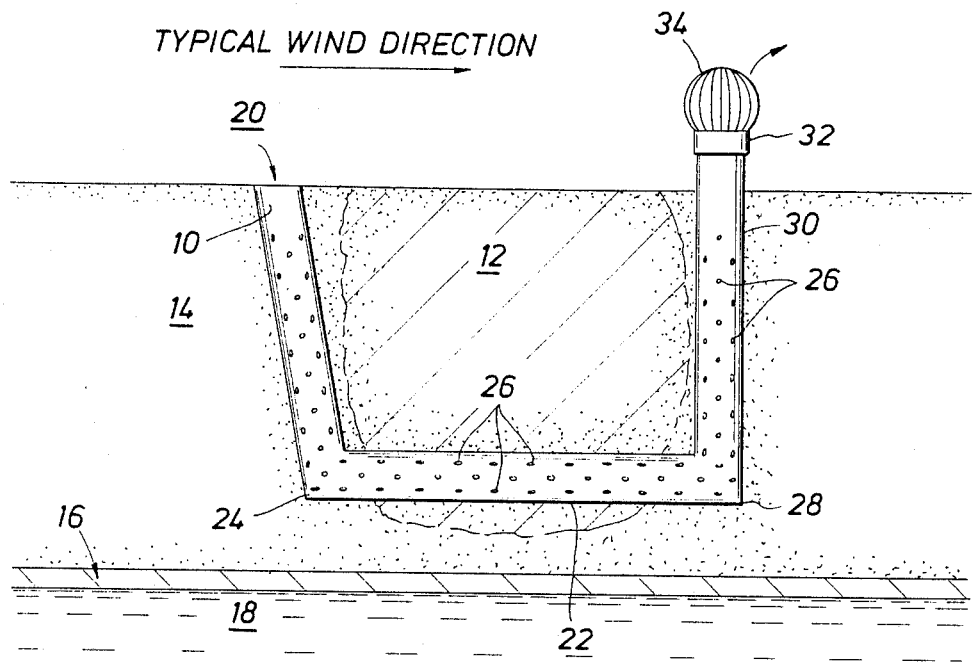
FIG. 1 is a cross-sectional view of a preferred embodiment according to the invention.

Reference will now be made in detail to embodiments of the invention illustrated in the accompanying drawings. A preferred system for reducing the level of volatile contaminants which have penetrated the soil is shown in FIG. 1 comprising a first, substantially vertically positioned, borehole 10, within or adjacent to the contaminated area 12, traversing the soil 14 to a depth above the capillary fringe 16 of the water table 18, and communicating at its upper end with ambient air 20. Generally the boreholes of the system need not be plumb vertical, but may diverge to an extent of 45 degrees or more. It is only necessary to penetrate the soil to a depth sufficient that the generally horizontal conduit portion of the system will be positioned such that the volatile contaminants will be transported from the surrounding soil into the system by diffusion. Preferably said first borehole and hereinafter described second borehole comprise a casing or pipe to ensure against cave-in or closure of the passageway.

Said system further comprises horizontally positioned conduit 22 traversing the contaminated soil 12 at an elevation above said capillary finge 16, said horizontal conduit 22 having an inlet end 24 in fluid communication with said first borehole 10, and having a plurality of apertures 26 disposed along its length for admitting vapors of the volatile contaminant within the contaminated soil 12 to the interior of said horizontal conduit 22. For maximum effectiveness the apertures will be disposed around the circumference of the conduit, to permit entry of vapors from below as well as from above and adjacent said conduit. If desired the first and second borehole casings may likewise contain a plurality of apertures to assist in the diffusive venting of the contaminates soil.

The horizontal conduit need not be level, but if desired, may be inclined to the inlet or outlet end, or may be inclined toward or from both ends, i.e. in the shape of a shallow vee, or u-shaped as for example if flexible conduit is used; even a serpentine pathway may be used if necessary to accommodate a boulder or similar obstruction in the desired position.

Said horizontal conduit at its outlet end 28 is in fluid communication with a second, generally vertically positioned, borehole 30, within or adjacent to the contaminated soil 12 and spaced apart from said first borehole 10. Said second borehole 30 has its upper end 32 in fluid communication with ambient air 20. The system further comprises wind-driven venting means 34, such as a wind turbine, operatively connected to said second borehole at its upper end 32, whereby air is drawn through said first borehole 10, thence to said horizontal conduit 22 and said second borehole 30 to sweep vapors of the volatile contaminants that have entered into the system from the soil via apertures 26, into the atmosphere to be dispersed by the wind. In a preferred embodiment the second, venting, borehole is positioned downwind from the first borehole, with respect to the typical wind direction above the contaminated soil, so as to minimize entry of the removed volatiles into the first, i.e. air inlet borehole.

Generally, the underground pathway of the system will have a diameter in the range from about 7.5 to about 61 cm (3-24 in), and preferably in the range from about 10.1 to about 40.6 cm (4-16 in). The total underground length of the system will be in the range from about 5 to about 50 m (16 to 160.4 ft) and preferably in the range from about 10 to about 30 m (32.08-96.24 ft). The system may be installed at any desired depth down to the water saturation zone, i.e. the capillary fringe above the water table. Preferably the horizontal portion of the system is installed at a depth below the surface of less than about three m (9.84 ft), and most preferably in the range from about 1 to about 2.5 m (3.21-8.02 ft). The system may be constructed of any material which is resistant to deterioration by both the contaminant vapors and to the soil. Exemplary materials are metals such as copper and galvanized iron, concrete, and polymeric materials such as polybutylene and polyvinyl chloride.

The underground portion of the system is most conveniently installed by excavating a slit trench in the desired location, installing the system tubing and backfilling the trench with the excavates soil. In areas of less porous soils the material disturbed by the excavation will typically have increased porosity resulting in enhanced diffusion of the contaminant vapors into the system. If desired nutrients may be incorporated into the backfill material to enhance biodegradation of the contaminant, thereby further reducing the amount of contamination to be removed by the system. Nutrients which may be added are materials such as ammonium chloride, ammonium nitrate, sodium phosphate, sodium carbonate, sodium nitrate, iron sulphate, magnesium sulphate and others known to those skilled in the art of microbiology.

Figure 2:
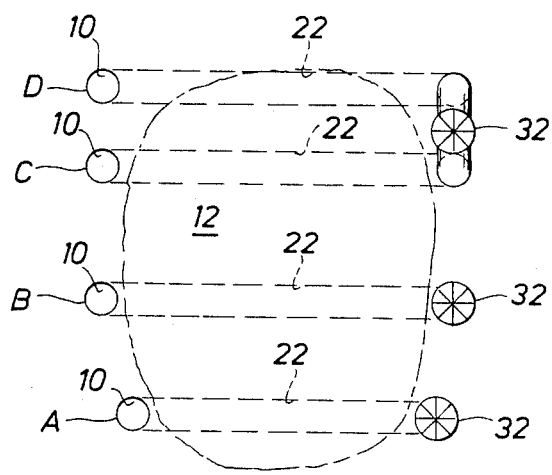
FIG. 2 is a top view of the embodiment shown in FIG. 1, and depicting that a plurality of systems may be used in a single contaminated area.
Figure 3:
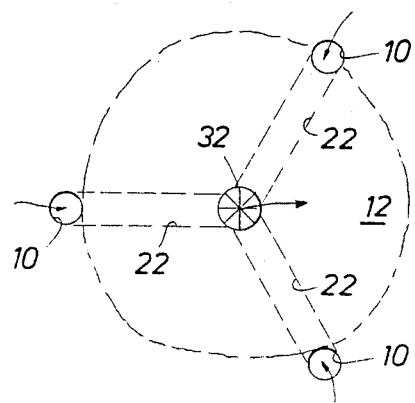
FIG. 3 is a plan view of another embodiment of the invention comprising a plurality of first, air intake, boreholes each connected to a horizontal conduit and disposed at nominal equal distance around a single, vapor venting, second borehole, said second borehole being in fluid communication with each said horizontal conduit.

FIG. 2 illustrates a top or plan view of the contaminated soil wherein a plurality of systems as described in FIG. 1 are arrayed in substantially parallel alignment to effect reduction of the contaminants from a relatively large area. In FIGS. 2 and 3 the numerals have the same meaning designated in FIG. 1; systems A and B are each equipped with a wind turbine, however, it is within the scope of the invention that two or more systems may be manifolded to a single wind turbine as shown for systems C and D. In such an array the spacing between individual systems will depend substantially upon the porosity of the soil and the size of the tubing used in the horizontal conduit. Preferably adjacent systems are disposed with a distance in the range from about 0.3 to about 3 meters (0.98-9.84 ft.) between them, and most preferably in the range from about 1 to about 2.5 meters (3.21-8.02 ft.).

FIG. 3 illustrates a plan view of another embodiment wherein a plurality of first, air intake boreholes 10 disposed at nominal equal distance peripherally around a single second, exhaust, borehole 32 are each connected to separate horizontal conduits 22, and each said horizontal conduit 22 is connected to, i.e. in fluid communication with said single second borehole 32; the system being disposed within or adjacent to soil contaminated by a volatile material 12.

The invention will now be further illustrated by the following illustrative embodiment.

The principal of operation is to vent the system such that the concentration level of the volatile contaminant inside the system is practically zero. Under such conditions the volatile material will be transported from the surrounding soil into the system by chemical diffusion. In applying the system of the invention to a spill area the following assumptions are made: firstly, that initially the surrounding soil contains uniformly distributed volatile material, whose mass concentration (mass of volatile per bulk volume of soil) is known; secondly that as the result of diffusion into the system, the volatile is being removed from the surrounding soil.

At any point in time there is a given circle around the apertured horizontal conduit (and boreholes when apertured) within which the volatile material has been removed (when a mixture of volatile compounds such as gasoline is involved then a particular compound of lower volatility such as for example benzene may be chosen). Further removal occurs at the moving boundary of this circle. Beyond this boundary $(r > r_c)$ the concentration of a given compound is constant. Therefore, no dispersive flux occurs there. Within the circle it is assumed that the radial mass flow rate $Q_r$ is constant in space for any $r < r_c$, although it changes in time as the boundary moves. This assumption may be expressed as follows:

$$Q_r = 2\pi r D \frac{dC_s}{dr} \quad (1)$$

where:

D = diffusivity
$C_s$ = saturated hydrocarbon concentration in the gas phase
$Q_r$ = mass flow rate per unit length of pipe Integrating equation 1 from the pipe ($r=r_o$) to the circle boundary ($r=r_c$) leads to $$Q_r = 2\pi D C_s \left( \ln \frac{r_c}{r_o} \right) - 1 \qquad (2)$$

This diffusive flow into the pipe results in depletion of hydrocarbon mass (M) in the soil and the increase of radius $r_c$. The relevant mass balance equation is:

$$Q_r = \frac{dM}{dt} = M\pi 2 r_c \frac{dr_c}{dt} \text{ or} \qquad (3)$$

$$2\pi D C_s \left( \ln \frac{r_c}{r_o} \right) - 1 = M 2\pi r_c \frac{dr_c}{dt} \qquad (4)$$

Integrating equation 4 from time $t=0$ to $t=t_o$ leads to $$t_o = \frac{M}{2 D C_s} \left[ r_c^2 \left( \ln \frac{r_c}{r_o} - \tfrac{1}{2} \right) + \tfrac{1}{2} r_o^2 \right] \qquad (5)$$

Equation 5 expresses the relationship between the time of dispersive venting ($t_o$) and the radius of the decontaminated zone $r_c$.

The foregoing may be applied to a particular spill area by the determination of a few specific parameters for the compound(s) involved. These parameters are: (1) the residual saturation of the volatile material in the particular soil of the spill area, (2) specific density of the contaminant, (3) the fraction of the the low volatility component in the spilled material, such as for example, the amount of benzene in gasoline, (4) the diffusivity of the contaminant in soil pore air, and (5) solubility of the low volatility component in air in the presence of the remainder of the spilled material.

In a hypothetical example gasoline containing 5% benzene is spilled onto fine sand and is expected to penetrate to a depth of two meters. The mass concentration of benzene in the contamination zone may be estimated using the expression:

$$M = S_h \rho_h F_b \qquad (6)$$

where
$S_h$ = residual saturation of gasoline, $S_h = 15$ l/m³ for coarse and medium sand, $S_h = 25$ l/m³ for fine sand
$\rho_h$ = specific density of gasoline, 0.8 k/l
$F_b$ = weight fraction of benzene in gasoline, $F_b \approx 5\%$
Thus the residual benzene concentration in fine sand is m = 1 kg/m³
Diffusivity of benzene in soil pore air D 0.16 m²/day
Solubility of benzene in air in the presence of gasoline $C_s = 9.10^{-3}$ kg/m³
Pipe radius $r_o = 0.25$ ft It is assumed that the diffusivity of benzene in soil pore air, D = 0.16 m²/day, and that the solubility of benzene in air in the presence of gasoline, $C_s = 0.009$ kg/m³, and that an array of systems will be installed at a depth of one meter and spaced at intervals of two meters throughout the area of contamination, using apertured polybutylene tubing having a diameter of 10.1 cm (4 in.). Solving the above equation (1) it is estimated that the benzene will be removed in about twelve months time. However, this calculation is supposed to indicate an order of magnitude, rather than a precise estimate.

As will be appreciated by those skilled in the art the invention has the further benefit of facilitating biodegradation of the contaminant within the soil by enabling oxygen from the air swept through the system to penetrate into the soil via the apertures in the system.

We claim:

1. A system for reducing the concentration of volatile organic compounds in underground soil contaminated with volatile organic compounds which comprises:
   a first vertically positioned borehole within or adjacent the contaminated area and traversing the soil to a depth above the capillary fringe of the water table, said first borehole communicating at its upper end with ambient air,
   a horizontally positioned conduit traversing said contaminated soil at an elevation above said capillary fringe and having an inlet end in fluid communication with said first borehole, and having a plurality of apertures disposed along its length for admitting vapors of said volatile organic compounds to the interior of said horizontally positioned conduit,
   a second vertically positioned borehole within or adjacent the contaminated area and spaced apart from said first borehole, said second borehole being in fluid communication with said horizontally positioned conduit, and having an upper end in fluid communication with air above the surface of the soil, and
   a wind turbine operatively connected to said upper end of said second vertically positioned borehole to draw ambient air through said first borehole, thence through said horizontally positioned conduit and said second borehole to sweep vapors of said volatile organic compounds that have entered the system from the soil into the atmosphere to be dispersed by the wind.

2. A system as in claim 1, wherein said second borehole is positioned downwind from said first borehole with respect to the typical direction of the wind above said contaminated soil.

3. A system as in claim 1, wherein said wind-driven venting means is sized to draw a air at a gas space velocity through the system of from about 0.03 to about 0.305 m/sec. at the typical velocity of the prevailing wind above the soil.

4. A system as in claim 1, wherein a plurality of first boreholes each connected to a horizontal conduit are disposed at nominal equal distance peripherally around a single second borehole, said second borehole being in fluid communication with each said horizontal conduit.

5. An array of a plurality of systems according to claim 1 disposed in substantially parallel alignment with a distance between adjacent systems in the range from about 0.5 to about 2 meters.

* * * * *